(No Model.)

G. A. & H. T. EVANS.
CAR STARTER.

No. 261,324.                              Patented July 18, 1882.

WITNESSES:
Walter S. Dodge.
W. C. Chaffee

INVENTOR:
George A. Evans,
Henry T. Evans,
by Dodge & Son,
Attys.

UNITED STATES PATENT OFFICE.

GEORGE A. EVANS, OF KINGSEY, AND HENRY T. EVANS, OF PARISH OF NOTRE DAME DE TOUTE GRACE, QUEBEC, CANADA.

CAR-STARTER.

SPECIFICATION forming part of Letters Patent No. 261,324, dated July 18, 1882.

Application filed May 9, 1882. (No model.)

*To all whom it may concern:*

Be it known that we, GEORGE ABBOTT EVANS and HENRY THOMAS EVANS, the former of Kingsey, Drummond county, and the latter of the parish of Notre Dame de Toute Grace, county of Jacques-Cartier, Quebec, Canada, have invented certain Improvements in Car-Starters, of which the following is a specification.

Our invention relates to car-starters; and it consists in a novel arrangement of a sliding draw-bar, a double-acting pawl or dog, and a ratchet secured upon the car-axle, all as hereinafter explained, whereby the pawl or dog is caused to engage with and impart motion to the ratchet when the bar is drawn or moved from either end.

Figure 1:
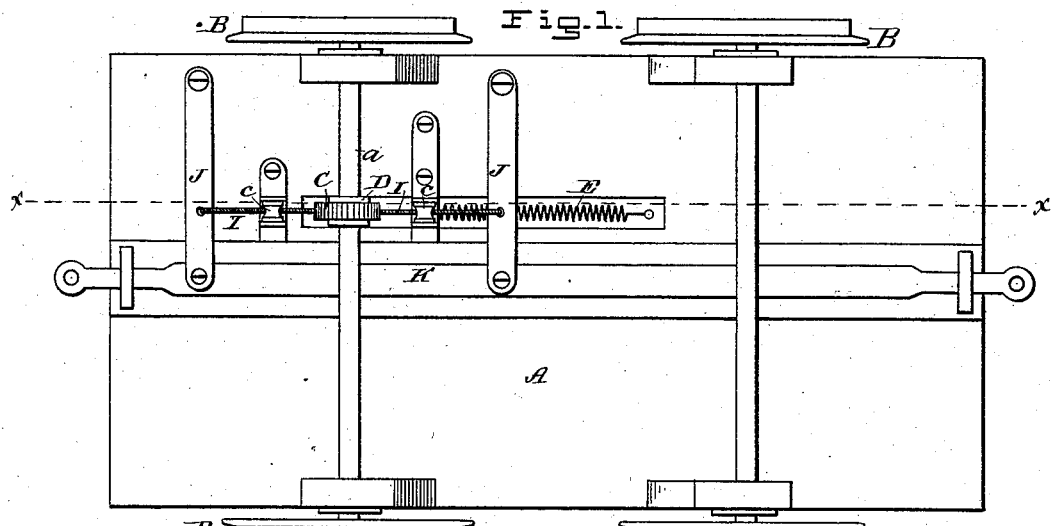
Figure 2:
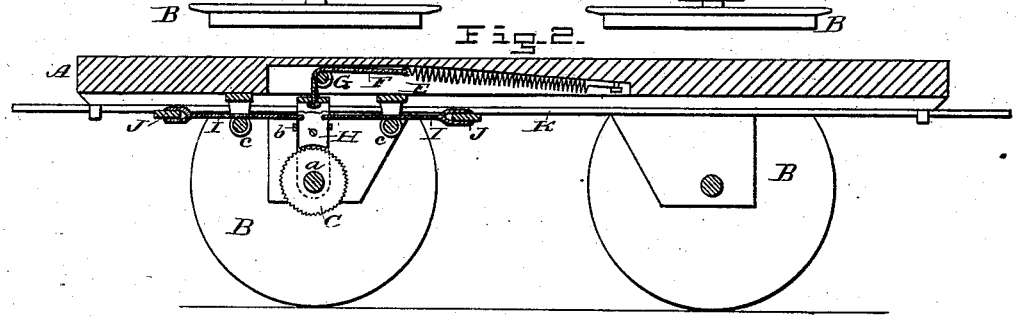
Figure 3:
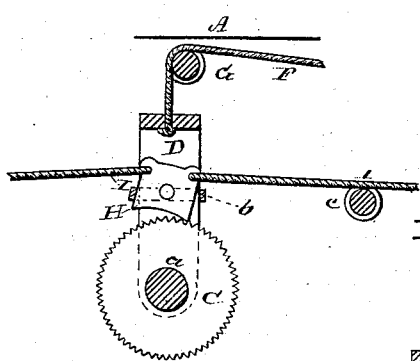
Figure 4:
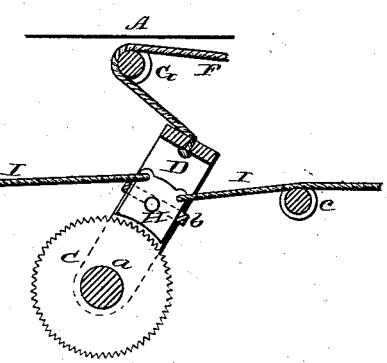
Figure 5:
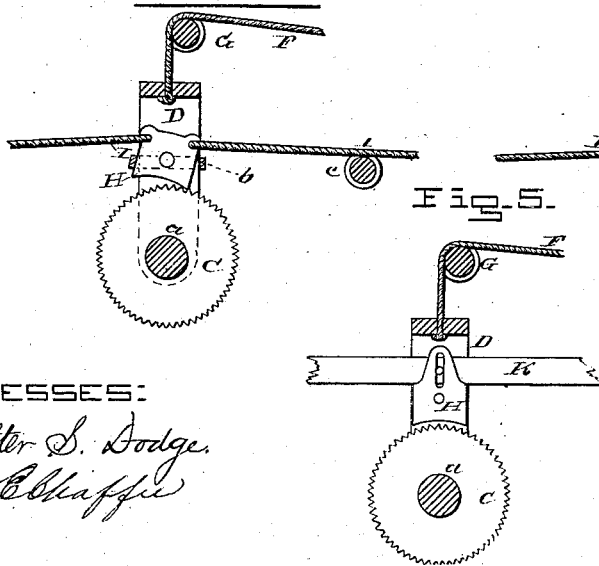

In the accompanying drawings, Figure 1 represents a bottom plan view of our improved car-starter; Fig. 2, a longitudinal section on the line $x$ $x$ of Fig. 1; Figs. 3 and 4, enlarged views, illustrating the action of the pawl; Fig. 5, a modification.

The object of our invention is to produce a simple and efficient car-starter, and particularly to provide one which may be operated with equal facility from either end of the car, so that the device may be conveniently applied to and used upon cars which are run either end foremost.

Referring now to the drawings, A represents the bottom of a car, and B the wheels upon which it is supported and carried. The axle $a$ of one pair of wheels has firmly secured upon it a toothed wheel or ratchet, C, the teeth of which are of the same form on both faces. Mounted upon said axle, and straddling the ratchet-wheel C, is a swinging yoke, D, held normally in an upright or vertical position by the tension of a spring, E, one end of which is connected with the upper end of yoke D by a flexible band or connection, F, passing upward and over a pulley, G, the periphery of which is vertically in line with the center of the axle and ratchet-wheel, as shown in Fig. 2. It will be seen that by this arrangement the spring E is made to draw directly upward upon the yoke, and thereby to retain it in a vertical position, or to restore it to such position when moved therefrom either forward or backward.

Within the yoke D is pivoted a double pawl or locking-dog, H, adapted to engage with the teeth of the ratchet-wheel C when rocked or tipped upon its pivot in either direction, but to be disengaged therefrom when in an upright position, or when it is inclined at the same angle with the yoke—or, in other words, whenever its center line is radial to the axle $a$, in which postion it is normally held by a spring, $b$.

To the upper end of the pawl or dog is attached a strong flexible band, chain, or cable, I, which is carried lengthwise of the car on both sides of the yoke, over pulleys $c$, and attached at its ends to pivoted bars or levers J, jointed or connected at their moving ends to a longitudinally-sliding draw-bar, K, extending beneath the car, and projecting beyond the same at both ends to permit the attachment of the horses thereto. If, now, the bar K be moved lengthwise, it will be seen that the arm or lever J in front thereof, as the car moves, will draw upon the chain or band I, and thereby rock or tip the dog or pawl H upon its pivot, causing it to engage with the ratchet-wheel, as shown in Fig. 3, the yoke being meanwhile held in its upright position by the tension of spring E. As soon as the dog engages with the ratchet-wheel it is prevented from rocking or tipping further upon its pivot, and as the sliding of the draw-bar continues the yoke is tipped forward with the dog or pawl which it carries. As the upper end of the dog or pawl swings forward toward the pulley $c$ the band or cable draws upon the said dog in the direction of its length, causing it to assume a radial position relative to the axle and the ratchet-wheel, and also causing it to disengage from the latter, as shown in Fig. 4. The yoke and dog or pawl remain in the position shown in Fig. 4 while the car is being drawn; but as soon as the draft on draw-bar K ceases the spring E draws back the yoke D to its upright position, carrying with it the dog or pawl H and the levers or arms J, and the draw-bar K connected therewith, ready for like action when power or draft is again applied to the draw-bar. It will be seen that the action is precisely the same whether the team be attached to one or the other end of the draw-bar.

The draw-bar may in some cases be directly connected with the dog or pawl, the upper end of the pawl being slotted and connected with the draw-bar by a pin passing through the slot and into the bar, as in Fig. 5, and in other particulars the construction may be more or less varied.

The springs E and b may be of rubber or metal and of any desired form.

The levers J may be replaced by compound levers, and the draw-bar K will be limited in its movements by stops to remove the strain from the starting mechanism.

We are aware that a reversible pawl has before been employed in a car-starter to enable the starter to work either way; but such a pawl requires special devices for reversing it, whereas ours is entirely automatic in action. We do not therefore claim a pawl arranged to be reversed by manual operation.

Having thus described our invention, what we claim is—

1. In a car-starter, the combination of an axle provided with a ratchet-wheel, a double-acting pawl, arranged, substantially as shown and described, to engage with the ratchet-wheel, and a sliding draw-bar connected with the pawl, substantially as and for the purpose set forth.

2. In a car-starter substantially such as shown, a double-acting pawl or dog adapted and arranged to engage automatically with a ratchet on the car-axle when moved toward either end of the car.

3. In combination with a car-axle having a ratchet-wheel secured upon it, a swinging yoke mounted upon the axle and carrying a pawl or dog, a spring arranged to hold the yoke normally in an upright position, a sliding draw-bar, and intermediate connections between the pawl and draw-bar, whereby the movement of said bar is made to first tip the dog and cause it to engage with and turn the ratchet, then to disengage from the ratchet, substantially as explained.

4. The herein-described car-starter, consisting of axle $a$, provided with ratchet-wheel C, yoke D, pawl H, spring $b$, band or chain I, arms J, draw-bar K, spring E, and pulleys $c\ c$ and G, all combined and operating substantially as set forth.

GEORGE ABBOTT EVANS.
HENRY THOMAS EVANS.

In presence of—
J. H. DYSON,
G. T. HILL.